(12) United States Patent
Lee

(10) Patent No.: US 11,086,409 B2
(45) Date of Patent: Aug. 10, 2021

(54) SYSTEM, DEVICE, AND METHOD FOR INPUTTING INFORMATION ON BASIS OF SOUND WAVE

(71) Applicant: CAFE24 CORP., Seoul (KR)

(72) Inventor: Jae Suk Lee, Seoul (KR)

(73) Assignee: CAFE24 CORP., Seoul (KR)

( * ) Notice: Subject to any disclaimer, the term of this patent is extended or adjusted under 35 U.S.C. 154(b) by 0 days.

(21) Appl. No.: 15/550,371

(22) PCT Filed: Aug. 3, 2015

(86) PCT No.: PCT/KR2015/008081
§ 371 (c)(1),
(2) Date: Aug. 11, 2017

(87) PCT Pub. No.: WO2016/133253
PCT Pub. Date: Aug. 25, 2016

(65) Prior Publication Data
US 2018/0032147 A1    Feb. 1, 2018

(30) Foreign Application Priority Data
Feb. 16, 2015   (KR) .................. 10-2015-0023251

(51) Int. Cl.
*G06F 3/023* (2006.01)
*G06F 3/02* (2006.01)
(Continued)

(52) U.S. Cl.
CPC .......... *G06F 3/0233* (2013.01); *G06F 3/0202* (2013.01); *G06F 3/023* (2013.01);
(Continued)

(58) Field of Classification Search
CPC ........... G08C 2201/00; G08C 2201/30; G08C 2201/33; G08C 2201/92; G08C 2201/20;
(Continued)

(56) References Cited

U.S. PATENT DOCUMENTS 5,386,251 A * 1/1995 Movshovich .......... H04B 1/202
340/12.23
6,236,339 B1 * 5/2001 Kamizono ............ G06F 3/0231
178/17 C
(Continued)

FOREIGN PATENT DOCUMENTS

CN          202003309 U    10/2011
JP          H11-265252 A    9/1999
(Continued)

*Primary Examiner* — Franklin D Balseca
(74) *Attorney, Agent, or Firm* — Invenstone Patent, LLC

(57) ABSTRACT

Disclosed herein is a system, device, and method for inputting information on the basis of a sound wave. The system for inputting information on the basis of a sound wave may comprise: a keyboard including a plurality of input keys, each of which generates a unique key sound wave as the input key is struck by a user; and an information input unit for acquiring at least one key sound wave generated as at least one of the input keys on the keyboard is struck, detecting at least one key value corresponding to the acquired at least one key sound wave, and inputting the detected key value to a device.

14 Claims, 9 Drawing Sheets

(51) Int. Cl.
*G06F 3/16* (2006.01)
*G06F 15/02* (2006.01)

(52) U.S. Cl.
CPC ......... *G06F 3/0219* (2013.01); *G06F 3/0227* (2013.01); *G06F 3/0231* (2013.01); *G06F 3/167* (2013.01); *G06F 15/0225* (2013.01)

(58) Field of Classification Search
CPC ......... G08C 2201/21; H04N 21/42226; H04N 21/42227; H04N 21/42228; G06F 3/0233; G06F 3/0219; G06F 3/0231; G06F 3/167; G06F 3/023; G06F 3/0238; G06F 15/0225; G06F 3/0202; G06F 3/0227; H03M 11/00; H03M 11/20; H03M 11/02; H03M 11/04
See application file for complete search history.

(56) References Cited

U.S. PATENT DOCUMENTS

| | | | |
|---|---|---|---|
| 6,309,275 B1* | 10/2001 | Fong | A63H 3/28 446/175 |
| 7,656,464 B2* | 2/2010 | Pfiffer | G08C 19/28 348/734 |
| 2010/0123834 A1* | 5/2010 | Brodersen | G08C 19/28 348/734 |
| 2014/0293754 A1 | 10/2014 | Jang | |
| 2015/0295661 A1* | 10/2015 | Huang | G08C 23/04 398/202 |
| 2015/0355877 A1* | 12/2015 | Kim | G06F 3/16 700/94 |

FOREIGN PATENT DOCUMENTS

| | | |
|---|---|---|
| JP | 2000099247 A | 4/2000 |
| KR | 20120065928 A | 6/2012 |
| KR | 10-1411650 B1 | 6/2014 |
| WO | 2014204114 A1 | 12/2014 |

* cited by examiner

SYSTEM, DEVICE, AND METHOD FOR INPUTTING INFORMATION ON BASIS OF SOUND WAVE

CROSS-REFERENCE TO RELATED APPLICATIONS

This application is a national stage of International Application No. PCT/KR2015/008081, filed Aug. 3, 2015, which claims the benefit of priority to Korean Application No. 10-2015-0023251, filed Feb. 16, 2015 in the Korean Intellectual Property Office, the disclosures of which are incorporated herein by reference.

TECHNICAL FIELD

The present invention relates to an information input system, device and method based on a sound wave and, more particularly, to an information input system, device and method based on a sound wave, which are capable of inputting a key value typed by a user to a terminal based on a sound wave.

BACKGROUND ART

Lately, as ultrahigh-speed wireless communication infrastructure is constructed and various digital wireless devices come into use, tasks performed through a fixed terminal device, such as a PC, in a conventional technology have been made possible through a portable terminal device. In particular, a smart terminal, such as a smart pad or smart phone that is recently increasingly used, tends to be explosively used because the smart terminal favorably provides portability, that is, the greatest advantage of a portable terminal device, and has performance not inferior to the PC and the size of a screen becomes much wider than before.

A portable terminal device has an advantage in that it can provide services of new and convenient forms which could not be provided by an existing fixed type device because it can be carried by a user and used anywhere and at any time. However, on the one hand, it is a fact that the portable terminal device involves a lot of inconvenience in inputting information compared to a fixed type terminal, such as a PC including a separate keyboard, due to its viviparous limit because the portable terminal device aims at a small and light-weight terminal in order to guarantee portability.

In order to overcome such inconvenience, various auxiliary input devices capable of inputting information to a mobile terminal are being developed. For example, Korean Patent Application Publication No. 2002-0061999 discloses a keyboard and method for inputting the alphabet through wireless communication, wherein a plurality of key input means is provided and information can be input to a portable terminal by sending a key input value to the portable terminal using Bluetooth.

However, such a wireless keyboard using Bluetooth involves several problems, such as a reduction of a recognition rate attributable to crosstalk inevitably generated because a radio wave is used, the emergence of human body harmfulness attributable to the occurrence of electromagnetic waves, and a limit that wireless keyboard cannot be used if power is not supplied.

DISCLOSURE

Technical Problem

The present invention has been made to solve such problems and has an object of providing an information input system, device and method based on a sound wave, which are capable of inputting a key value to a terminal based on a sound wave.

Technical Solution

In order to accomplish the object, in an aspect, the present invention provides an information input system based on a sound wave. The information input system based on a sound wave includes a keyboard including a plurality of input keys generating unique key sound waves when the input keys are stroked by a user; and an information input unit obtaining at least one key sound wave generated when at least one input key of the keyboard is stroked, detecting at least one key value corresponding to the obtained at least one key sound wave, and inputting the detected at least one key value to a device.

The information input unit may operate in a key value registration mode in response to a registration request signal. In the key value registration mode, the information input unit may obtain each key sound wave generated when each input key of the keyboard is stroked, may receive each key value corresponding to the obtained each key sound wave, and may store the received key value.

In the key value registration mode, when a user sequentially strikes N (N is an integer of 1 or more) input keys, the information input unit may sequentially obtain N key sound waves, may sequentially receive N key values corresponding to the obtained N key sound waves, and may store the received N key values in a database. For example, the information input unit may display a user interface which displays that the N key sound waves have been obtained and in which the N key values corresponding to the N key sound waves are capable of being input, and may store the N key values received from the user interface in the database by associating the N key values with information of the N key sound waves.

The keyboard may include a plurality of the input key; and a sound wave output unit generating a unique sound wave through contact with a stroked input key when each input key is stroked. The sound wave output unit may include at least any one of a resonance part outputting an acoustic sound wave of a unique frequency corresponding to the stroked input key when the resonance part comes into contact with one side of the stroked input key; and an electronic sound output unit outputting an electronic sound of a unique frequency corresponding to the stroked input key when the electronic sound output unit comes into contact with one side of the stroked input key.

Meanwhile, in order to accomplish the object of the present invention, in another aspect, the present invention provides an information input device. The information input device may include a key sound wave acquisition unit obtaining at least one key sound wave generated when at least one input key of a keyboard is stroked from the keyboard including a plurality of the input keys generating unique key sound waves when the input keys are stroked by a user; a key value detection unit detecting at least one key value corresponding to the obtained at least one key sound wave; and an input unit inputting the at least one key value to a device.

The information input device may further include a key value registration unit which operates in a key value registration mode in response to a registration request signal, receives each key value corresponding to each obtained key sound wave when the key sound wave acquisition unit obtains the each key sound wave generated when each input key of the keyboard is stroked in the key value registration mode, and stores the received key value.

When the sound wave acquisition unit sequentially obtains N key sound waves as a user continuously strikes N (N is an integer of 1 or more) input keys, the key value registration unit may sequentially receive N key values corresponding to the obtained N key sound waves and store the received N key values in a database.

The key value registration unit may display a user interface which displays that the N key sound waves have been obtained and in which the N key values corresponding to the N key sound waves are capable of being input, and may store the N key values received from the user interface in the database by associating the N key values with information of the N key sound waves.

Meanwhile, in order to accomplish the object of the present invention, in yet another aspect, the present invention provides an information input method. The information input method is performed by an information input device, and may include the steps of obtaining at least one key sound wave generated when at least one input key of a keyboard is stroked from the keyboard including a plurality of the input keys generating unique key sound waves when the input keys are stroked by a user; detecting at least one key value corresponding to the obtained at least one key sound wave; and inputting the at least one key value to a device.

The information input method may further include in the key value registration mode, obtaining each key sound wave generated when each input key of the keyboard is stroked; and receiving each key value corresponding to the obtained each key sound wave and storing the received key value.

When N key sound waves are sequentially obtained by a sound wave acquisition unit as a user sequentially strikes N (N is an integer of 1 or more) input keys in the step of obtaining the each key sound wave, the step of storing the received key value may include the step of receiving N key values corresponding to the obtained N key sound waves and storing the received N key values in a database.

The information input method may further include the step of displaying a user interface which displays that the N key sound waves have been obtained and in which the N key values corresponding to the N key sound waves are capable of being input. The step of storing the received key value may include the step of storing the N key values received from the user interface in the database by associating the N key values with information of the N key sound waves.

Meanwhile, in order to accomplish the object of the present invention, in yet another aspect, the present invention provides a non-powered keyboard. The non-powered keyboard may include a plurality of input keys; and a sound wave output unit generating a unique sound wave through contact with a stroked input key when each of the input keys is stroked. The sound wave output unit may include a resonance part outputting an acoustic sound wave of a unique frequency corresponding to the stroked input key when the resonance part comes into contact with one side of the stroked input key.

Meanwhile, in order to accomplish the object of the present invention, in yet another aspect, the present invention provides an information input method. The information input method may include the steps of generating, by a keyboard, at least one key sound wave when at least one input key of the keyboard is stroked; obtaining, by a device, the at least one key sound wave generated by the keyboard; detecting at least one key value corresponding to the obtained at least one key sound wave; and inputting the detected at least one key value to the device.

The information input method may further include the steps of in the key value registration mode, obtaining each key sound wave generated when each input key of the keyboard is stroked; and receiving each key value corresponding to the obtained each key sound wave and storing the received key value.

When N key sound waves are sequentially obtained by a sound wave acquisition unit as a user sequentially strikes N (N is an integer of 1 or more) input keys in the step of obtaining the each key sound wave, the step of storing the received key value may include the step of receiving N key values corresponding to the obtained N key sound waves and storing the received N key values in a database.

The information input method may further include the step of displaying a user interface which displays that the N key sound waves have been obtained and in which the N key values corresponding to the N key sound waves are capable of being input. The step of storing the received key value may include the step of storing the N key values received from the user interface in the database by associating the N key values with information of the N key sound waves.

Advantageous Effects

As described above, in accordance with the present invention, a user can easily input required information to the device using an acoustic or electronic sound generated by the keyboard as a medium for information transmission. Accordingly, the input of information is possible even without connecting the keyboard to the device in a wired or wireless way, and problems, such as a reduction of a recognition rate attributable to crosstalk which may occur in a wireless keyboard using Bluetooth and the emergence of human body harmfulness attributable to the occurrence of electromagnetic waves, can be solved. Furthermore, information input is possible through the non-powered keyboard even without supplying power to the keyboard. According to circumstances, information can be input using a plurality of objects capable of distinguishing sounds although the keyboard is not present.

MODE FOR INVENTION

Figure 1:
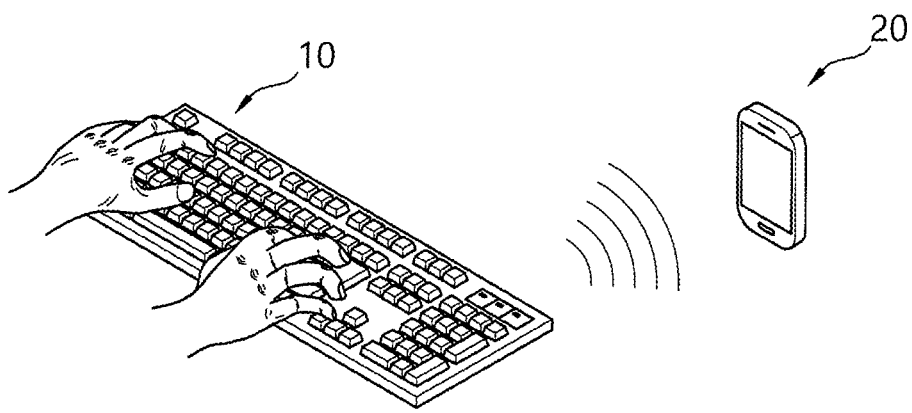
FIG. 1 is a conceptual diagram for illustrating the concept of an information input system based on a sound wave according to a preferred embodiment of the present invention.

The present invention may be changed in various ways and may have several embodiments. Specific embodiments are illustrated in the drawings and are described in detail. It is however to be understood that the present invention is not intended to be limited to the specific embodiments and the present invention includes all changes, equivalents and substitutions which fall within the spirit and technological scope of the present invention.

Terms, such as the first and the second, may be used to describe various elements, but the elements should not be restricted by the terms. The terms are used to only distinguish one element from the other element. For example, a first element may be named a second element without departing from the range of right of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number should be construed as including an expression of the plural number unless clearly defined otherwise in the context. It is to be understood that in this application, a term, such as "include or "have", is intended to designate that a characteristic, number, step, operation, element or part which is described in the specification or a combination of them are present and does not exclude the existence or possible addition of one or more other characteristics, numbers, steps, operations, elements, parts or combinations of them in advance.

Unless defined otherwise, all terms used herein, including technological terms or scientific terms, have the same meanings as those generally understood by persons of ordinary skill in the technological field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Hereinafter, preferred embodiments of the present invention are described in more detail with reference to the accompanying drawings. In describing the present invention, in order to help general understanding, the same reference numerals are used to denote the same elements throughout the drawings, and a redundant description of the same elements is omitted.

FIG. 1 is a conceptual diagram for illustrating the concept of an information input system based on a sound wave according to a preferred embodiment of the present invention.

As shown in FIG. 1, the information input system 1 based on a sound wave according to a preferred embodiment of the present invention may input information to a device 20 based on a sound wave generated by a keyboard 10. The device 20 may be equipped with an information input unit capable of detecting information based on a sound wave generated by the keyboard and inputting the information to the device.

The keyboard 10 includes a plurality of input keys for inputting the alphabet. A corresponding letter may have been carved in each of the input keys by printing, etc. so that a user is aware of a corresponding input key as in a common keyboard. When each input key is stroked by a user, a unique sound wave is generated.

In accordance with a preferred embodiment of the present invention, the keyboard 10 may be a non-powered acoustic keyboard not requiring power. That is, the keyboard 10 does not need to be supplied with power and does not need to be connected to the device 20 in a wired (for example, a USB) or wireless (for example, Bluetooth or Zigbee) way.

Figure 2:
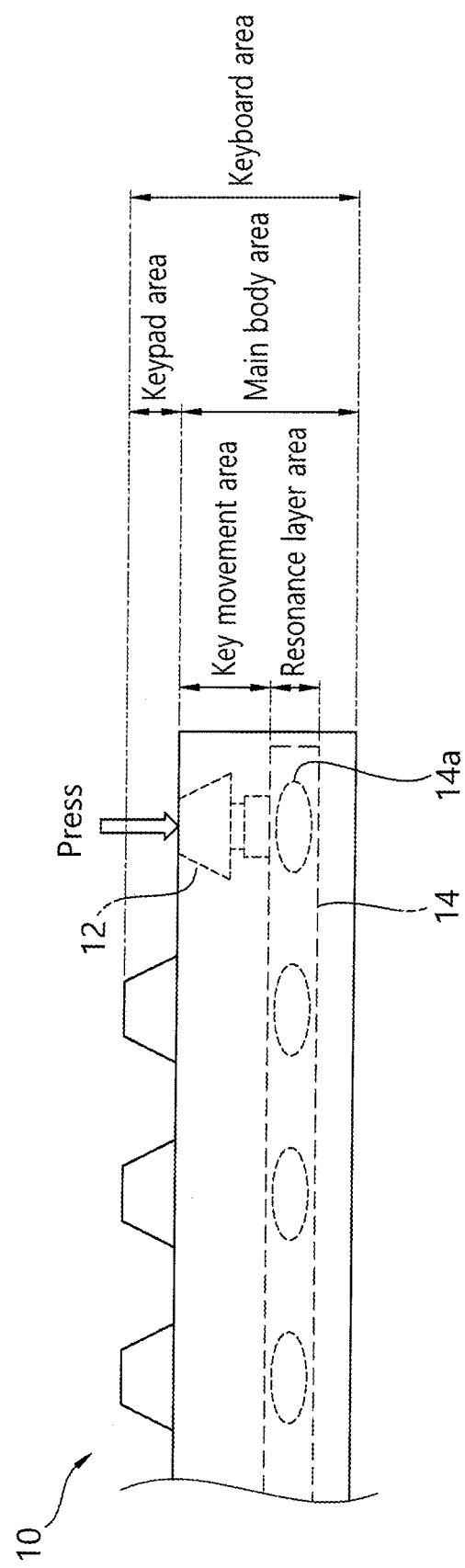
FIG. 2 is a plan view showing a portion of the plane of a keyboard according to a preferred embodiment of the present invention and schematically shows an operating structure of a non-powered keyboard.

When each of the input keys of the keyboard 10 is stroked by a user, it may generate a unique acoustic key sound wave. An example of the structure of such a keyboard 10 is shown in FIG. 2. FIG. 2 is a plan view showing a portion of the plane of the keyboard 10 according to a preferred embodiment of the present invention and schematically shows an operating structure of a non-powered keyboard.

Referring to FIG. 2, an input key 12 of the keyboard 10 is pressed when a user presses the corresponding input key 12 within a key movement area, and restores to the original location when the user releases his or her finger from the corresponding input key 12. When the input key 12 is pressed, one end of the input key 12, for example, the bottom of the input key 12 comes into contact with a resonance part 14, thereby generating a sound wave. In this case, the generated sound wave is a unique sound wave corresponding to the corresponding input key 12 and is a sound wave different from other input keys. That is, the input keys of the keyboard generate different sound waves.

The keyboard 10 is equipped with the resonance part 14. The resonance part 14 may be disposed within a resonance layer area, and may include a plurality of resonance units 14a coming into contact with the plurality of input keys 12 so that the resonance units come into contact with the plurality of input keys 12 to generate different sounds for each input key. When a thing is stroked from the outside, it generates a unique sound wave depending on a material, size, thickness, shape, etc. of the thing. Accordingly, the resonance unit 14a of the resonance part 14 has a different shape, material, size, thickness, etc. and generates a different sound wave when it comes into contact with the input keys 12.

Figure 3:
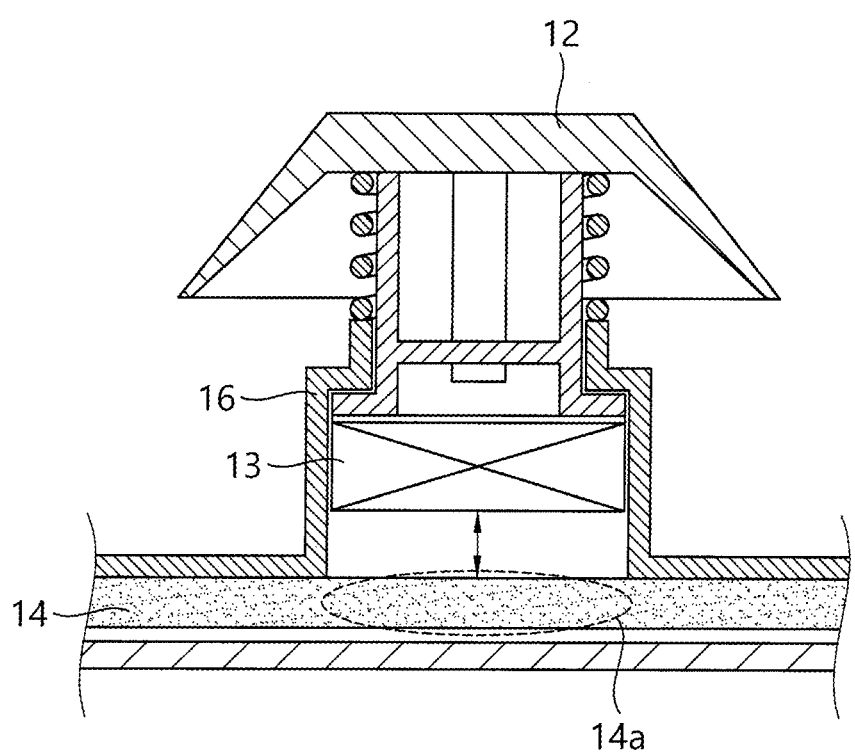
FIG. 3 is a cross-sectional view illustratively showing the input key structure of the keyboard according to a preferred embodiment of the present invention.

FIG. 3 is a cross-sectional view illustratively showing the input key structure of the keyboard 10 according to a preferred embodiment of the present invention.

As shown in FIG. 3, a stroke part 13 for generating a sound wave by stroking the resonance unit 14a is formed at the bottom of the input key 12. The input key 12 is supported by a driving module 16, and the driving of the pressing and press-releasing of the input key 12 is guided by the driving module 16. The embodiment shown in FIG. 3 shows that the resonance part 14 is configured in a resonance plate form. For example, each resonance unit 14a that belongs to the resonance plate made of metal and that is a portion coming into contact with each input key 12 may generate a different sound wave because it has a different thickness. The resonance plate may be made of various materials, such as plastic and wood, in addition to metal.

Figure 4:
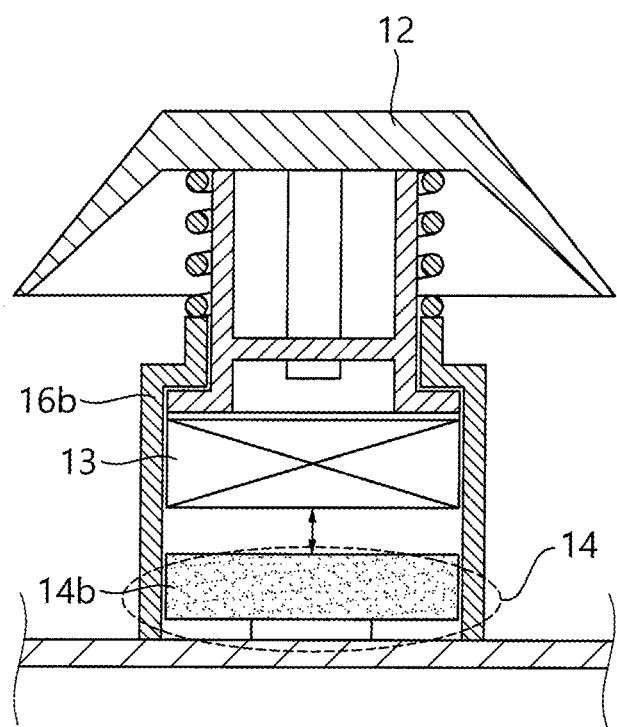
FIG. 4 is a cross-sectional view showing an embodiment in which the input key structure of the keyboard has been differently configured and shows an example in which a resonance unit is individually configured within an input key module.

FIG. 4 is a cross-sectional view showing an embodiment in which the input key structure of the keyboard has been differently configured and shows an example in which the resonance unit is individually configured within an input key module.

As shown in FIG. 4, a resonance part 14*b* coming into contact with the stroke part 13 formed at the bottom of the input key 12 may be configured to be individually included in a driving module 16*b* and to generate a sound wave.

On the one hand, in accordance with anther embodiment of the present invention, the keyboard may be a keyboard which generates an electronic sound. In this case, power is supplied to the keyboard, but the keyboard may not include a wired or wireless connection for data transmission with a device. Such a keyboard may include an electronic sound output unit that generates an electronic sound of a unique frequency corresponding to a corresponding input key when the electronic sound output unit comes into contact with one side of the stroked input key, instead of the resonance part in the non-powered keyboard. On the other hand, in accordance with anther embodiment, a keyboard having both the functions of the acoustic keyboard and the electronic keyboard may be implemented. In this case, a selection unit that enables the acoustic keyboard and the electronic keyboard to be selectively used may be provided.

Meanwhile, the device 20 may be equipped with the information input unit which detects input information based on a sound wave generated by the keyboard 10 and inputs the information to the device 20. The information input unit may obtain at least one key sound wave generated when at least one input key of the keyboard 10 is stroked, may detect at least one key value corresponding to the obtained at least one key sound wave, and may input the detected key value to the device 20.

Figure 5:
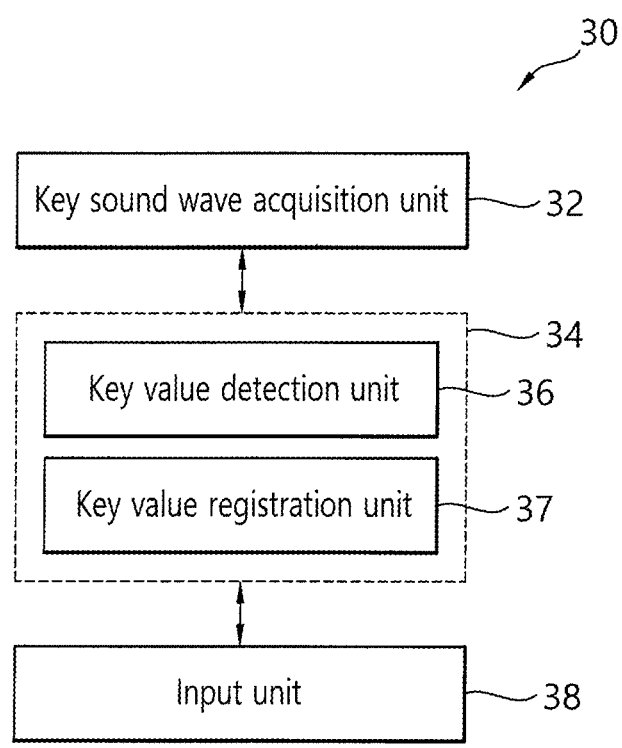
FIG. 5 is a block diagram for illustrating the configuration of an information input unit included in a device.

FIG. 5 is a block diagram for illustrating the configuration of the information input unit included in the device 20.

As shown in FIG. 5, an information input unit 30 may include a key sound wave acquisition unit 32, an operation unit 34 and an input unit 38. An operation and data flow between the elements of the information input unit 30 may be controlled by the operation unit 34. The operation unit 34 may include a key value detection unit 36 and a key value registration unit 37.

The key sound wave acquisition unit 32 may obtain at least one key sound wave generated when at least one input key of the keyboard 10 is stroked by a user. The key sound wave may mean a sound wave generated in response to the stroke of an input key. The key sound wave acquisition unit 32 may be based on a high-sensitivity microphone included in the device 20.

The key value registration unit 37 may perform a function for registering a key value corresponding to a key sound wave. For example, the key value registration unit 37 may operate in a key value registration mode in response to a key value registration request signal. In the key value registration mode, when the key sound wave acquisition unit 32 obtains each key sound wave generated when each input key of the keyboard 10 is stroked, the key value registration unit 37 may receive each key value corresponding each obtained key sound wave and store the received key value.

Figure 6:
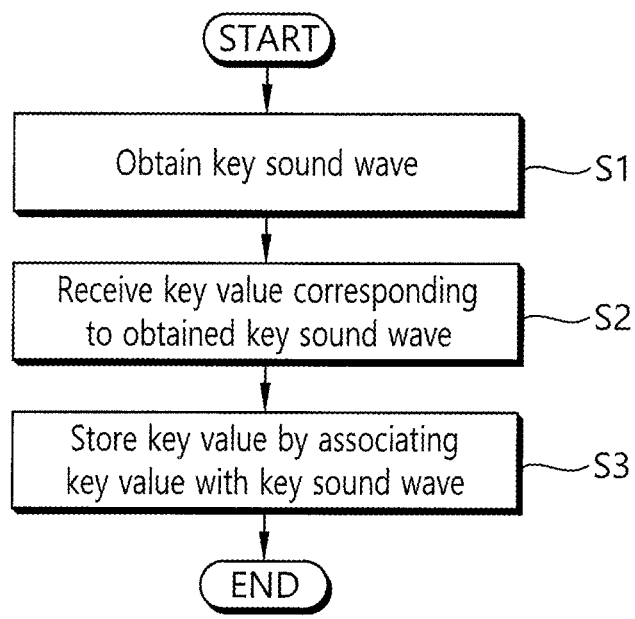
FIG. 6 is a flowchart for illustrating a flow of a key value registration procedure of the information input unit.

FIG. 6 is a flowchart for illustrating a flow of a key value registration procedure of the information input unit 30. Such a procedure may be performed by interlocking between the key sound wave acquisition unit 32 and the key value registration unit 37 of the operation unit 34.

Referring to FIG. 6, first, the key value registration unit 37 may display a menu in which the key value registration mode can be executed on the device 20. When a user selects the menu, a key value registration request signal is generated and the key value registration mode is executed.

In the key value registration mode, the user may stroke at least one input key of the keyboard 10. In response thereto, each key sound wave is generated in accordance with each stroked input key. The key sound wave acquisition unit 32 may obtain each key sound wave (step: S1). Next, the key value registration unit 37 receives each key value for each obtained key sound wave (step: S2). The key value registration unit 37 may store each key value in a database by associating each key value with information about each key sound wave (step: S3). The database may be included in the device.

Such a procedure of registering a key value may be performed in unit of one key value or may be performed in unit of a plurality of key values. If the procedure is performed in unit of a plurality of key values, the number of key values may be previously determined or may be set by a user and may be a specific number.

For example, the registration procedure of registering a key value may be performed in unit of one key value. For example, if the key values of input keys "A", "B" and "C" to be registered, the key value registration unit 37 may display a message, indicating that a user has to stroke one input key, through the device 20 in the key value registration mode. When the user strikes the input key "A", the sound wave acquisition unit 32 obtains the key sound wave of the stroked input key "A." The key value registration unit 37 receives a key value "A" corresponding to the obtained key sound wave and stores the received key value in the database. Next, when the user strikes the input key "B", the sound wave acquisition unit 32 obtains the key sound wave of the input key "B." The key value registration unit 37 may receive a key value "B" corresponding to the obtained key sound wave and store the received key value in the database. Next, when the user strikes the input key "C", the sound wave acquisition unit 32 obtains the key sound wave of the input key "C." The key value registration unit 37 may receive a key value "C" corresponding to the obtained key sound wave and store the received key value in the database.

Meanwhile, for example, the registration procedure of registering a key value may be performed in unit of a plurality of key values. For example, if the key values of input keys "A", "B" and "C" to be registered, the key value registration unit 37 may display a message, indicating that a user has to sequentially strike the plurality of input keys, through the device 20 in the key value registration mode. When the user sequentially strikes the input keys "A", "B" and "C", the sound wave acquisition unit 32 sequentially obtains the key sound waves of the respective stroked input keys "A", "B" and "C." The key value registration unit 37 receives key values "A", "B" and "C" corresponding to the obtained key sound waves, respectively, and stores the received key values in the database.

In order to register a key value, the key value registration unit 37 may guide one or a plurality of input keys to be stroked through a user interface. The key value registration unit 37 may manage input key information for each keyboard type, may allow a keyboard type to be used to be selected, and may guide an input key to be stroked depending on the keyboard type.

For example, the key value registration unit 37 may guide input keys so that the registration of key values is performed for each preset input key group. For example, the key value registration unit 37 may output a message, such as "please sequentially strike input keys in the top line of the keyboard from the left" or "please enter numeric keys of the keyboard." In response thereto, a user strikes the input keys in the top line of the keyboard 10.

Figure 7:
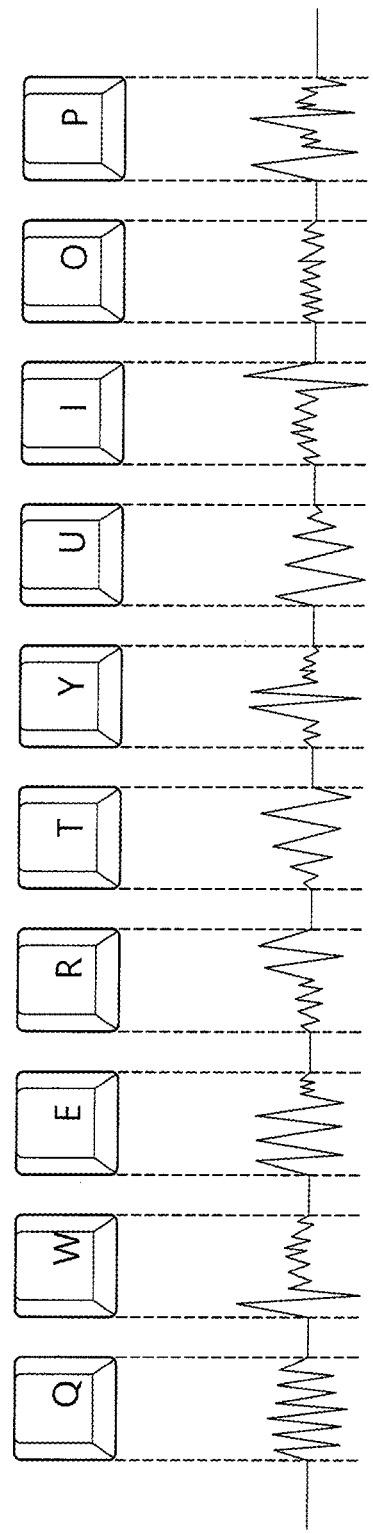
FIG. 7 is an exemplary diagram showing an example in which a user has stroked input keys in the top line of the keyboard in response to the guidance of the key value registration unit of the keyboard.

FIG. 7 is an exemplary diagram showing an example in which a user has stroked input keys in the top line of the keyboard 10 in response to the guidance of the key value registration unit of the keyboard 10.

As shown in FIG. 7, assuming that keys in the top line of the keyboard 10 are 10 input keys "Q", "W", "E", "R", "T", "Y", "U", "I", "O" and "P", a user may sequentially strikes the 10 input keys from the input key "Q" to the input key "P." When the input keys are sequentially stroked, the keyboard sequentially generates 10 key sound waves. Accordingly, the key sound wave acquisition unit 32 may sequentially obtain the 10 different key sound waves.

Figure 8:
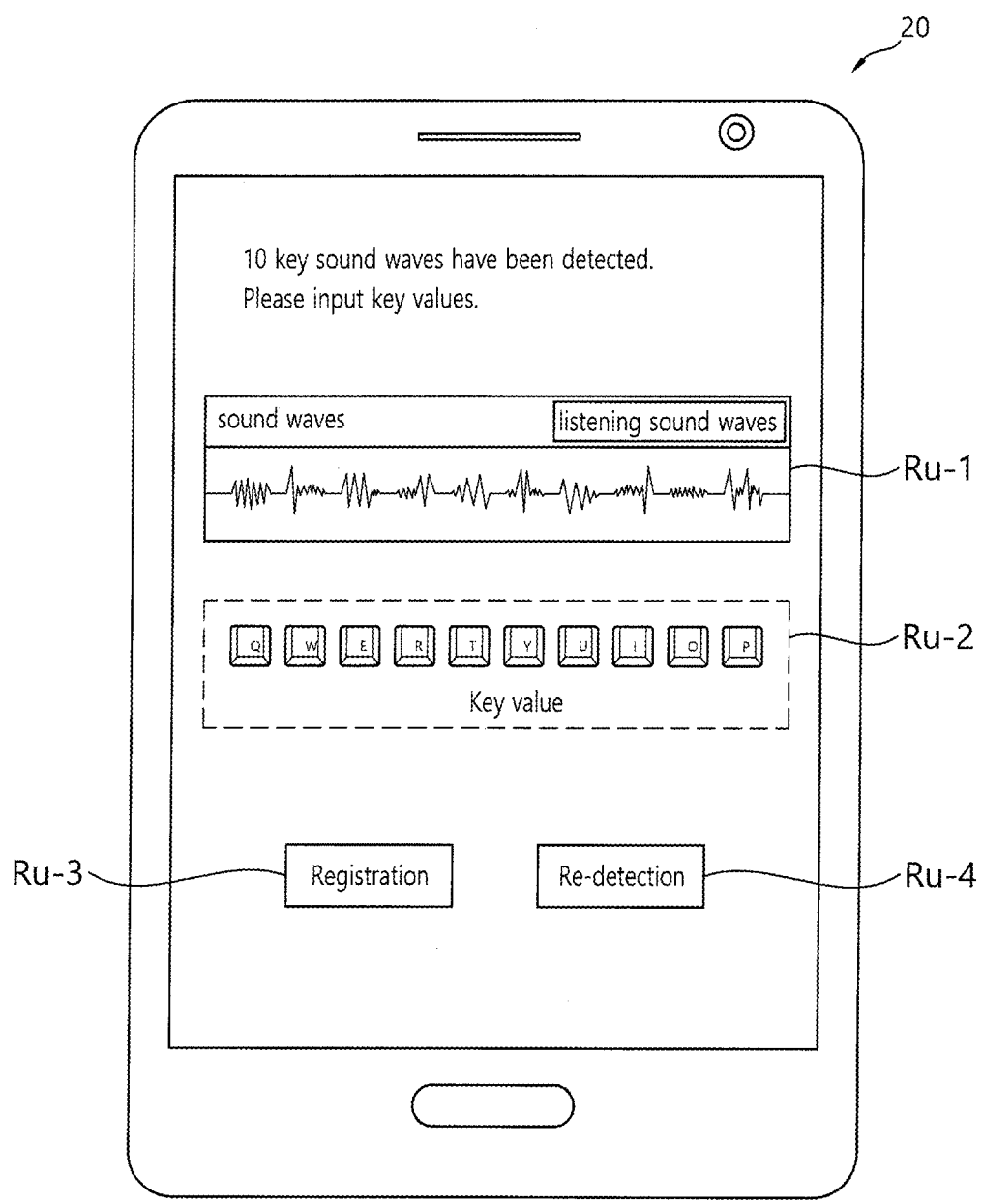
FIG. 8 is an exemplary diagram illustratively showing a user interface displayed on the device by the key value registration unit.

FIG. 8 is an exemplary diagram illustratively showing a user interface displayed on the device 20 by the key value registration unit 37.

As shown in FIG. 8, when the 10 different key sound waves are obtained, the key value registration unit 37 may display graphic information Ru-1 so that the user can easily check that the 10 key sound waves have been obtained through the user interface. The user interface may provide a button by which obtained key sounds wave can be heard so that the user can check the obtained key sound waves.

The key value registration unit 37 may display an input box Ru-2 in which key values corresponding to the obtained 10 key sound waves can be input. The user may input the key values, corresponding to the 10 key sound waves, in the input box Ru-2. Meanwhile, if the type of keyboard 10 has been previously selected, the key value registration unit 37 may automatically have input 10 key values, corresponding to the 10 key sound waves, to the input box Ru-2, and may allow the input 10 key values to be modified if there is abnormality.

When the user selects a registration button Ru-3 after inputting the key values, the key value registration unit 37 may store the 10 key values corresponding to the 10 key sound waves in the database by associating the 10 key values with the 10 key sound waves. If there is abnormality in obtaining a key sound wave or if other input key sets are to be registered, the user has only to select a re-detection button Ru-4.

Figure 9:
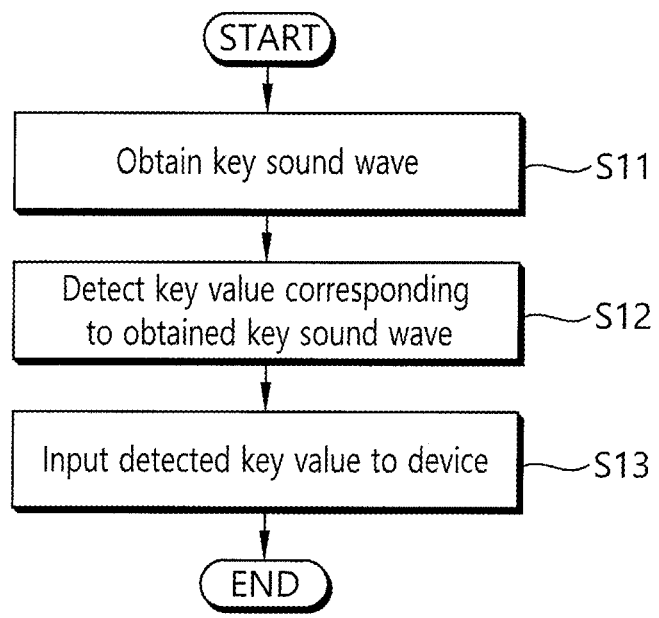
FIG. 9 is a flowchart for illustrating a process of inputting information to the device based on a sound wave.

When the registration of the key values is completed, the input of information based on a sound wave may be performed using the keyboard 10. FIG. 9 is a flowchart for illustrating a process of inputting information to the device 20 based on a sound wave.

As shown in FIG. 9, a user may strike at least one input key using the keyboard 10. In response thereto, the keyboard 10 may generate at least one key sound wave corresponding to the at least one input key.

The key sound wave acquisition unit 32 of the device 20 obtains the at least one key sound wave generated by the keyboard 10 (step: S11). The key value detection unit 36 analyzes the at least one key sound wave obtained by the sound wave acquisition unit 32, and detects a key value corresponding to the at least one key sound wave based on key value information stored in the database (step: S12). When the at least one key value is detected by the key value detection unit 36, the input unit 38 inputs the detected at least one key value to the device 20 (step: S13). Accordingly, the device 20 can receive information typed by the user through the keyboard 10.

As described above, in accordance with a preferred embodiment of the present invention, a user can easily input required information to the device using an acoustic or electronic sound generated by the keyboard as a medium for information transmission. Accordingly, the input of information is possible even without connecting the keyboard to the device in a wired or wireless way, and problems, such as a reduction of a recognition rate attributable to crosstalk which may occur in a wireless keyboard using Bluetooth and the emergence of human body harmfulness attributable to the occurrence of electromagnetic waves, can be solved. Furthermore, according to some embodiments, information input is possible through the non-powered keyboard even without supplying power to the keyboard.

Meanwhile, in accordance with anther embodiment of the present invention, information can be input using a plurality of objects capable of distinguishing sounds although the keyboard is not present. For example, a variety of types of things, such as water glass, a table and a drink can, may be considered to be input keys, and a key value corresponding to a key sound wave generated when a corresponding thing is stroked may be registered. Information may be input to a device by striking the registered input key.

Although the preferred embodiments of the present invention have been described above, those skilled in the art will understand that the present invention may be modified and changed in various ways without departing from the technological contents and scope of the present invention described in the claims. Accordingly, a change of the future embodiments of the present invention will not depart from the technology of the present invention.

The invention claimed is:

1. An information input system based on a sound wave, comprising:
a specific keyboard of a plurality of keyboards, the specific keyboard comprising a plurality of input keys generating unique key sound waves when the plurality of input keys are stroked by a user, the plurality of input keys including a plurality of input key groups; and
an information input unit including a database for storing input key information for each of the plurality of keyboards, the key input information of the specific keyboard including a predetermined number of key values for each input key group of the plurality of input key groups, the information input unit configured to operate in a key value registration mode in response to a registration request signal, the key value registration mode operated by
selecting the specific keyboard from among the plurality of keyboards,
selecting an input key group of the plurality of input key groups,
obtaining, using a microphone, at least one key sound wave generated when at least one input key of the selected input key group is stroked, each of the at least one key sound wave generated when the at least one input key of the selected input key group is stroked being an acoustic sound wave,
detecting at least one key value corresponding to the obtained at least one key sound wave generated when the at least one input key of the selected input key group is stroked, and
inputting the at least one key value to a device connected to the specific keyboard via a wired or wireless network, the inputted at least one key value corresponding to the obtained at least one key sound wave generated when the at least one input key of the selected input key group is stroked, wherein in the key value registration mode, when the user sequentially strikes N (N is an integer of 2 or more) input keys of the selected input key group, the information input unit sequentially obtains N key sound waves corresponding to the stroked N input keys of the selected input key group, sequentially receives N key values corresponding to the obtained N key sound waves, and stores the received N key values in the database, wherein the predetermined number of key values for each input key group of the plurality of key groups of the input key information of the specific keyboard stored in the database are preset according to each input key group of the plurality of input key groups of the specific keyboard, each of the plurality of input key groups of the specific keyboard being one row of keys of a plurality of rows of keys of the specific keyboard, wherein the plurality of input key groups of the specific keyboard includes a first group of input keys and a second group of input keys, wherein the plurality of rows of keys of the specific keyboard includes
a first row of keys sequentially arranged in a first straight line across the specific keyboard, the first row of keys including the first group of input keys, and
a second row of keys sequentially arranged in a second straight line across the specific keyboard, the second straight line being parallel to the first straight line, the second row of keys excluding the first group of input keys,.

wherein the information input unit is further configured to:
store the N key values corresponding to the N key sound waves in the database by associating the N key values with information of the N key sound waves, and
display a user interface showing that the N key values corresponding to the N key sound waves are capable of being input, and wherein the user interface includes:
an input box (Ru-2) displayed in the key value registration mode by which the N key values corresponding to the N key sound waves can be input, the displayed input box including the stroked N input keys of the selected input key group, and
graphical information (Ru-1) enabling the user to verify, through the user interface, that each of the N key sound waves has been obtained through the input box, the displayed graphical information including a representation of the obtained N key sound waves respectively arranged linearly in correspondence to the N key values of the input box.

2. The information input system of claim 1,
wherein the user interface displays that the N key sound waves have been obtained, and
wherein the user interface provides:
a listening button by which obtained key sounds wave can be heard so that the user can check the obtained key sound waves, the listening button included in the graphical information of the user interface, and
a registration button (Ru-3), selectable after the N key values are input, to store the N key values corresponding to the N key sound waves in the database by associating the N key values with the N key sound waves.

3. The information input system of claim 1, wherein the specific keyboard comprises:
the plurality of input keys; and
a sound wave output unit generating a unique sound wave through contact with a stroked input key when each input key is stroked.

4. The information input system of claim 3, wherein the sound wave output unit comprises at least any one of:
a resonance part outputting an acoustic sound wave of a unique frequency corresponding to the stroked input key when the resonance part comes into contact with one side of the stroked input key; and
an electronic sound output unit outputting an electronic sound of a unique frequency corresponding to the stroked input key when the electronic sound output unit comes into contact with one side of the stroked input key.

5. The information input system of claim 1,
wherein the predetermined number of key values for each input key group of the plurality of input key groups equals a number of keys in each row, and for each row the predetermined number is greater than or equal to N, and wherein the information input unit is further configured to:
automatically input to the input box N key values of the specific keyboard, the N key values automatically inputted to the input box corresponding to the N key sound waves, and
enable modification of the automatically inputted N key values if there is abnormality in obtaining a key sound wave or if another input key group is to be registered.

6. The information input system of claim 1,
wherein the user interface provides a re-detection button (Ru-4), and
wherein the information input unit is further configured to re-detect at least one key value of a specific row among the plurality of rows of keys according to a selection of the re-detection button, if there is abnormality in obtaining a key sound wave or if another input key group is to be registered.

7. An information input device, comprising:
a key sound wave acquisition unit obtaining, using a microphone, at least one key sound wave generated when at least one input key of a specific keyboard of a plurality of keyboards is stroked, the specific keyboard comprising a plurality of input keys generating unique key sound waves when the plurality of input keys are stroked by a user, wherein the plurality of input keys includes a plurality of input key groups and the at least one key sound wave is an acoustic sound wave;
a key value detection unit detecting at least one key value corresponding to the obtained at least one key sound wave;
a key value registration unit configured to operate in a key value registration mode in response to a registration request signal, the key value registration unit including a database for storing input key information for each of the plurality of keyboards, the key input information of the specific keyboard including a predetermined number of key values for each input key group of the plurality of input key groups, the key value registration mode operated by selecting the specific keyboard from among the plurality of keyboards,
selecting an input key group of the plurality of input key groups,
obtaining, using a microphone, at least one key sound wave generated when at least one input key of the selected input key group is stroked, each of the at least one key sound wave generated when the at least one input key of the selected input key group is stroked being an acoustic sound wave,
detecting at least one key value corresponding to the obtained at least one key sound wave generated when the at least one input key of the selected input key group is stroked, and
an input unit inputting the detected at least one key value to a device connected to the specific keyboard via a wired or wireless network, the inputted at least one key value corresponding to the obtained at least one key sound wave generated when the at least one input key of the selected input key group is stroked,
wherein, when the key sound wave acquisition unit sequentially obtains N key sound waves as the user sequentially strikes N (N is an integer of 2 or more) input keys of the selected input key group, the key value registration unit sequentially receives N key values corresponding to the obtained N key sound waves and stores the received N key values in the database,
wherein the predetermined number of key values for each input key group of the plurality of key groups of the input key information of the specific keyboard stored in the database are preset according to each input key group of the plurality of input key groups of the specific keyboard, each of the plurality of input key groups of the specific keyboard being one row of keys of a plurality of rows of keys of the specific keyboard, wherein the plurality of input key groups of the specific keyboard includes a first
group of input keys and a second group of input keys,
wherein the plurality of rows of keys of the specific keyboard includes
a first row of keys sequentially arranged in a first straight line across the specific keyboard, the first row of keys including the first group of input keys, and
a second row of keys sequentially arranged in a second straight line across the specific keyboard, the second straight line being parallel to the first straight line, the second row of keys excluding the first group of input keys,
wherein the key value registration unit is further configured to:
store the N key values corresponding to the N key sound waves in the database by associating the N key values with information of the N key sound waves, and
display a user interface showing that the N key values corresponding to the N key sound waves are capable of being input, and
wherein the user interface includes:
an input box (Ru-2) displayed in the key value registration mode by which the N key values corresponding to the N key sound waves can be input, the displayed input box including the stroked N input keys of the selected input key group, and
graphical information (Ru-1) enabling the user to verify, through the user interface, that each of the N key sound waves has been obtained through the input box, the displayed graphical information including a representation of the obtained N key sound waves respectively arranged linearly in correspondence to the N key values of the input box.

8. The information input device of claim 7,
wherein the user interface displays that the N key sound waves have been obtained, and
wherein the user interface provides:
a listening button by which obtained key sounds wave can be heard so that the user can check the obtained key sound waves, the listening button included in the graphical information of the user interface, and
a registration button (Ru-3), selectable after the N key values are input, to store the N key values corresponding to the N key sound waves in the database by associating the N key values with the N key sound waves.

9. The information input device of claim 7,
wherein the predetermined number of key values for each input key group of the plurality of input key groups equals a number of keys in each row, and for each row the predetermined number is greater than or equal to N, and
wherein the key value registration unit is further configured to:
automatically input to the input box N key values of the specific keyboard, the N key values automatically inputted to the input box corresponding to the N key sound waves, and
enable modification of the automatically inputted N key values if there is abnormality in obtaining a key sound wave or if another input key group is to be registered.

10. The information input device of claim 7,
wherein the user interface provides a re-detection button (Ru-4), and
wherein the key value registration unit is further configured to re-detect at least one key value of a specific row among the plurality of rows of keys according to a selection of the re-detection button, if there is abnormality in obtaining a key sound wave or if another input key group is to be registered.

11. An information input method performed by an information input device that operates in a key value registration mode in response to a registration request signal, the information input method comprising steps of:
obtaining, using a microphone, at least one key sound wave generated when at least one input key of a specific keyboard of a plurality of keyboards is stroked, the specific keyboard comprising a plurality of input keys generating unique key sound waves when the plurality of input keys are stroked by a user, wherein the plurality of input keys includes a plurality of input key groups and the at least one key sound wave is an acoustic sound wave;
detecting at least one key value corresponding to the obtained at least one key sound wave;
storing input key information for each of the plurality of keyboards in a database, the key input information of the specific keyboard including a predetermined number of key values for each input key group of the plurality of input key groups, the key value registration mode operated by
selecting the specific keyboard from among the plurality of keyboards, selecting an input key group of the plurality of input key groups,
the obtaining step, and
the detecting step; and
inputting the at least one key value to a device connected to the specific keyboard via a wired or wireless network,
further comprising steps of:
in the key value registration mode, sequentially obtaining each key sound wave generated when each input key of the keyboard is stroked; and
receiving each key value corresponding to each obtained key sound wave and storing each received key value in the database;
wherein, when N key sound waves are sequentially obtained in the key value registration mode as the user sequentially strikes N (N is an integer of 2 or more) input keys of the selected input key group, the receiving step comprises receiving N key values corresponding to the obtained N key sound waves and the step of storing each received key value in the database comprises storing the received N key values in the database,
wherein the predetermined number of key values for each input key group of the plurality of key groups of the input key information of the specific keyboard stored in the database are preset according to each input key group of the plurality of input key groups of the specific keyboard, each of the plurality of input key groups of the specific keyboard being one row of keys of a plurality of rows of keys of the specific keyboard,
wherein the plurality of input key groups of the specific keyboard includes a first group of input keys and a second group of input keys, and
wherein the plurality of rows of keys of the specific keyboard includes
a first row of keys sequentially arranged in a first straight line across the specific keyboard, the first row of keys including the first group of input keys, and
a second row of keys sequentially arranged in a second straight line across the specific keyboard, the second straight line being parallel to the first straight line, the second row of keys excluding the first group of input keys,.
wherein the information input method further comprises:
storing the N key values corresponding to the N key sound waves in the database by associating the N key values with information of the N key sound waves, and
displaying a user interface showing that the N key values corresponding to the N key sound waves are capable of being input, and wherein the user interface includes:
an input box (Ru-2) displayed in the key value registration mode by which the N key values corresponding to the N key sound waves can be input, the displayed input box including the stroked N input keys of the selected input key group, and
graphical information (Ru-1) enabling the user to verify, through the user interface, that each of the N key sound waves has been obtained through the input box, the displayed graphical information including a representation of the obtained N key sound waves respectively arranged linearly in correspondence to the N key values of the input box.

12. The information input method of claim 11,
wherein the user interface displays that the N key sound waves have been obtained, and
wherein the user interface provides:
a listening button by which obtained key sounds wave can be heard so that the user can check the obtained key sound waves, the listening button included in the graphical information of the user interface, and
a registration button (Ru-3), selectable after the N key values are input, to store the N key values corresponding to the N key sound waves in the database by associating the N key values with the N key sound waves.

13. The information input method of claim 11,
wherein the predetermined number of key values for each input key group of the plurality of input key groups equals a number of keys in each row, and for each row the predetermined number is greater than or equal to N, and
wherein the information input method further comprises:
automatically inputting to the input box N key values of the specific keyboard, the N key values automatically inputted to the input box corresponding to the N key sound waves, and
modifying the automatically inputted N key values if there is abnormality in obtaining a key sound wave or if another input key group is to be registered.

14. The information input method of claim 11,
wherein the user interface provides a re-detection button (Ru-4), and
wherein the detecting step comprises re-detecting at least one key value of a specific row among the plurality of rows of keys according to a selection of the re-detection button, if there is abnormality in obtaining a key sound wave or if another input key group is to be registered.

* * * * *